(12) United States Patent
Ishii et al.

(10) Patent No.: US 10,741,896 B2
(45) Date of Patent: Aug. 11, 2020

(54) BATTERY SYSTEM

(71) Applicant: KABUSHIKI KAISHA TOSHIBA, Minato-ku (JP)

(72) Inventors: Haruchika Ishii, Kashiwazaki (JP); Kazuya Kuriyama, Saku (JP); Toshihide Arikawa, Kashiwazaki (JP); Hirotada Tahara, Kashiwazaki (JP); Masataka Shikota, Kashiwazaki (JP); Hiroki Inagaki, Yokohama (JP); Yuichi Kikuma, Kashiwazaki (JP); Kengo Kurata, Kashiwazaki (JP); Hirotaka Hayashida, Kashiwazaki (JP); Yoshinao Tatebayashi, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 1346 days.

(21) Appl. No.: 14/848,890

(22) Filed: Sep. 9, 2015

(65) Prior Publication Data

US 2015/0380787 A1    Dec. 31, 2015

Related U.S. Application Data

(63) Continuation of application No. PCT/JP2014/056197, filed on Mar. 10, 2014.

(30) Foreign Application Priority Data

Mar. 14, 2013 (JP) .................................. 2013-051596

(51) Int. Cl.
*H01M 10/06* (2006.01)
*H01M 4/525* (2010.01)
(Continued)

(52) U.S. Cl.
CPC ............. *H01M 16/00* (2013.01); *B60L 50/64* (2019.02); *B60L 58/21* (2019.02); *H01M 4/131* (2013.01);
(Continued)

(58) Field of Classification Search
CPC .. H01M 10/0525; H01M 10/44; H01M 10/06; H01M 4/485; H01M 4/505;
(Continued)

(56) References Cited

U.S. PATENT DOCUMENTS 6,132,902 A    10/2000  Miyasaka
7,927,740 B2    4/2011  Inagaki et al.
(Continued)

FOREIGN PATENT DOCUMENTS

CN    101685878 A    3/2010
CN    102651491 A    8/2012
(Continued)

OTHER PUBLICATIONS

CN 102651491 A online machine translaiton, translated on Feb. 19, 2019.*
(Continued)

*Primary Examiner* — Golam Mowla
(74) *Attorney, Agent, or Firm* — Oblon, McClelland, Maier & Neustadt, L.L.P.

(57) ABSTRACT

According to an embodiment, there is provided a battery system. The battery system includes a first battery and a second battery connected in parallel with the first battery. The first battery includes a lead storage battery. The second battery includes a nonaqueous electrolyte battery. The nonaqueous electrolyte battery includes a positive electrode and a negative electrode. The negative electrode includes a negative-electrode-mixture layer, and the negative-electrode-mixture layer contains lithium titanate. The positive
(Continued)

electrode contains a positive electrode active material $LiMn_{2-x}M(a)_xO_4$. A ratio of a battery capacity of the second battery to a battery capacity of the first battery is in a range of 1/133 to 1/2.

7 Claims, 3 Drawing Sheets

(51) Int. Cl.
| | |
|---|---|
| *H01M 4/485* | (2010.01) |
| *H01M 4/505* | (2010.01) |
| *H01M 10/0525* | (2010.01) |
| *H01M 16/00* | (2006.01) |
| *B60L 58/21* | (2019.01) |
| *B60L 50/64* | (2019.01) |
| *H01M 4/131* | (2010.01) |
| *H01M 10/44* | (2006.01) |
| *H01M 4/02* | (2006.01) |

(52) U.S. Cl.
CPC .......... *H01M 4/485* (2013.01); *H01M 4/505* (2013.01); *H01M 4/525* (2013.01); *H01M 10/0525* (2013.01); *H01M 10/06* (2013.01); *H01M 10/44* (2013.01); *H01M 2004/021* (2013.01); *H01M 2004/027* (2013.01); *H01M 2004/028* (2013.01); *H01M 2220/20* (2013.01); *Y02E 60/122* (2013.01); *Y02E 60/126* (2013.01); *Y02T 10/7011* (2013.01); *Y02T 10/7016* (2013.01); *Y02T 10/7061* (2013.01)

(58) Field of Classification Search
CPC ................. H01M 4/131; H01M 4/525; H01M 2004/021; H01M 2004/027; H01M 2004/028; H01M 2220/20; B60L 11/1864; B60L 11/1879
See application file for complete search history.

(56) References Cited

U.S. PATENT DOCUMENTS

| | | | |
|---|---|---|---|
| 2003/0148183 A1* | 8/2003 | Yamasaki | ............. H01M 4/131 429/231.1 |
| 2004/0096740 A1 | 5/2004 | Fukuzawa et al. | |
| 2008/0241689 A1 | 10/2008 | Takami et al. | |
| 2011/0076557 A1 | 3/2011 | Ishii et al. | |
| 2012/0169129 A1 | 7/2012 | Kim et al. | |
| 2013/0157137 A1* | 6/2013 | Fukushima | ........... H01M 4/131 429/231.1 |

FOREIGN PATENT DOCUMENTS

| | | | |
|---|---|---|---|
| JP | 10-117406 | A | 5/1998 |
| JP | 2003-174734 | A | 6/2003 |
| JP | 2004-171955 | A | 6/2004 |
| JP | 2007-122882 | A | 5/2007 |
| JP | 3930574 | B2 | 6/2007 |
| JP | 2007-227199 | A | 9/2007 |
| JP | 2008-186770 | A | 8/2008 |
| JP | 2008-243612 | A | 10/2008 |
| JP | 3159362 | U | 5/2010 |
| JP | 2011-078147 | A | 4/2011 |
| JP | 2011-091039 | A | 5/2011 |
| JP | 2012-130108 | A | 7/2012 |
| JP | 2012-248436 | A | 12/2012 |

OTHER PUBLICATIONS

Extended Search Report dated Oct. 14, 2016 in European Patent Application No. 14762965.3.
Combined Office Action and Search Report dated Aug. 24, 2016 in Chinese Patent Application No. 201480006716.0 (with English translation of Categories of Cited Documents).
Combined Office Action and Search Report dated May 25, 2017 in Chinese Patent Application No. 201480006716.0 (with unedited computer-generated English translation).
Hu Xinguo, "Power battery technology and application", Chemical Industry Press, Dec. 31, 2009, p. 201 (plus cover pages).
Office Action dated Jun. 21, 2016 in Japanese Patent Application No. 2015-505466 with English translation.
U.S. Appl. No. 12/888,889, filed Sep. 23, 2010, 2011-0076557, Ishii et al.
International Search Report dated May 13, 2014 in PCT/JP2014/056197 filed Mar. 10, 2014, with English translation.
Written Opinion dated May 13, 2014 in PCT/JP2014/056197 filed Mar. 10, 2014.
Michael M. Thackeray, "Spinel Electrodes for Lithium Batteries", Journal of the American Ceramic Society, vol. 82, No. 12, 1999, pp. 3347-3354.

* cited by examiner

BATTERY SYSTEM

CROSS-REFERENCE TO RELATED APPLICATIONS

This application is a Continuation Application of PCT Application No. PCT/JP2014/056197, filed Mar. 10, 2014 and based upon and claiming the benefit of priority from the Japanese Patent Application No. 2013-051596, filed Mar. 14, 2013, the entire contents of all of which are incorporated herein by reference.

FIELD

Embodiments described herein relate generally to a battery system.

BACKGROUND

Nonaqueous electrolyte batteries (for example, lithium ion batteries) having a high energy density attract attention as a large-sized and large-capacity power supply used for electric vehicles (EV), hybrid electric vehicles (HEV), electric motorcycle, and forklifts and the like. Development to make the lithium ion battery larger in size and to increase the capacity is under way while considering long life and safety. As the large-capacity power supply, battery modules including a large number of batteries connected with each other in series or in parallel to increase driving power have been developed.

The nonaqueous electrolyte battery includes a lithium ion battery using a carbon material for a negative electrode and a lithium battery using lithium titanate for a negative electrode.

The battery using the lithium titanate for the negative electrode has excellent life characteristics, safety, and input and output characteristics, and particularly excellent rapid-charge characteristics since a negative electrode potential is higher than that of a carbon negative electrode.

On the other hand, the nonaqueous electrolyte battery using lithium titanate for the negative electrode has a fast self-discharge speed and may have a high cost per capacity.

The nonaqueous electrolyte battery using lithium titanate for the negative electrode demonstrates rapid-charge ability when the nonaqueous electrolyte battery is charged using energy during braking and the like, such as at the time of the idling stop of an automobile, for example. However, the nonaqueous electrolyte battery is rapidly self-discharged and causes high cost per capacity as described above, which makes it difficult to practical use the nonaqueous electrolyte battery.

Examples of measures for compensating for this weak point include a method for connecting a nonaqueous electrolyte battery using lithium titanate for a negative electrode in parallel with a lead storage battery, the cost per unit capacity of which is low.

However, in this measure, there is disadvantage in that it is difficult to adjust the voltage of the nonaqueous electrolyte battery using lithium titanate for the negative electrode to the flat voltage of the lead storage battery.

Usually, a unit cell of a lead storage battery has a voltage of about 2.0 V. Generally, a commercially available lead storage battery is a 12 V or 24 V-battery in which unit cells, each of which is broadly available as a low-cost cell, are arranged in series. However, it is known that the lead storage battery has a flat operating voltage, and a state where the lead storage battery is held in a full charge state causes less battery deterioration. For example, when the 12 V-lead storage battery becomes the state in which the voltage is slightly more than 12 V which is the voltage at full charge, an electrolyte is decomposed, which causes a high probability of deterioration of the lead storage battery and generation of gas. When the lead storage battery becomes the state in which the voltage is slightly less than 12 V, the lead storage battery is in an overdischarge state, which promotes deterioration of the lead storage battery.

When a difference in voltages between terminals occurs in a plurality of batteries connected in parallel, the voltages between terminals are averaged so as to compensate the difference. Therefore, when a voltage between terminals in a battery connected in parallel with the lead storage battery and demonstrating rapid-charge-and-discharge characteristics and rapid-discharge characteristics, i.e., a nonaqueous electrolyte battery using lithium titanate for a negative electrode is largely changed during charge and discharge, the voltage of the lead storage battery is largely changed in accordance with the change, which may promote deterioration of the lead storage battery.

DETAILED DESCRIPTION

In general, according to an embodiment, there is provided a battery system. The battery system includes a first battery and a second battery connected in parallel with the first battery. The first battery includes a lead storage battery. The second battery includes a nonaqueous electrolyte battery. The nonaqueous electrolyte battery includes a positive electrode and a negative electrode. The negative electrode includes a negative electrode current collector and a negative-electrode-mixture layer formed on the negative electrode current collector, and the negative-electrode-mixture layer contains lithium titanate. The negative-electrode-mixture layer has a weight per unit area in a range of 15 g/m$^2$ to 100 g/m$^2$ and a thickness in a range of 5 μm to 50 μm. The positive electrode contains a positive electrode active material which contains a compound having a spinel structure and represented by LiMn$_{2-x}$M(a)$_x$O$_4$, wherein M(a) includes at least one element selected from the group consisting of Co, Ni, Al, Cr, Fe, Nb, Mg, B and F, and x is in a range of $0 \leq x \leq 0.7$. A ratio of a battery capacity of the second battery to a battery capacity of the first battery is in a range of 1/133 to 1/2.

Hereinafter, the embodiments will be described with reference to the drawings. It should be noted that the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be appropriately changed taking the following explanations and known technologies into consideration.

Embodiment

A battery system according to an embodiment includes a first battery and a second battery connected in parallel with the first battery.

The first battery includes a lead storage battery. The first battery may be a battery module including a plurality of lead storage batteries connected with each other in series.

For example, a commercially available lead storage battery can be used for the first battery. For example, the commercially available lead storage battery has a nominal voltage of 12 V or 24 V.

The second battery includes a nonaqueous electrolyte battery. The nonaqueous electrolyte battery is a nonaqueous electrolyte battery using lithium titanate for a negative electrode. In detail, the nonaqueous electrolyte battery included in the second battery includes a positive electrode and a negative electrode. The negative electrode includes a negative electrode current collector and a negative-electrode-mixture layer formed on the negative electrode current collector. The negative-electrode-mixture layer contains lithium titanate. The nonaqueous electrolyte battery using lithium titanate for the negative electrode can exhibit excellent life characteristics, excellent safety, and excellent input and output characteristics, and particularly excellent rapid-charge characteristics.

In the nonaqueous electrolyte battery included in the second battery, the positive electrode contains a positive electrode active material. The positive electrode active material contains a compound having a spinel structure and represented by $LiMn_{2-x}M(a)_xO_4$ wherein M(a) includes at least one element selected from the group consisting of Co, Ni, Al, Cr, Fe, Nb, Mg, B and F, and x is in a range of $0 \leq x \leq 0.7$.

The nonaqueous electrolyte battery including the positive electrode containing such a positive electrode active material and the negative electrode containing lithium titanate can show a substantially constant open-circuit voltage over a wide SOC range starting from a charge state (state of charge: SOC) close to a full charge state. Therefore, the nonaqueous electrolyte battery can suppress a steep change in an open-circuit voltage even when the nonaqueous electrolyte battery is rapidly charged.

When x is greater than 0.7, the operating voltage of the nonaqueous electrolyte battery included in the second battery is decreased. The preferable range of x is $0.001 \; x \leq 0.3$. When x is in the range, the nonaqueous electrolyte battery included in the second battery can exhibit excellent life characteristics.

Examples of such a positive electrode active material include $LiMn_{1.99}Al_{0.01}O_4$.

In the nonaqueous electrolyte battery included in the second battery, the negative-electrode-mixture layer included in the negative electrode has a weight per unit area in a range of 15 g/m² to 100 g/m² and a thickness in a range of 5 μm m to 50 μm.

The thickness of the negative electrode mixture layer can be measured by, for example, cross-sectional SEM.

The weight per unit cell of the negative-electrode-mixture layer can be measured by, for example, the following method.

First, materials of the negative electrode current collector included in the negative electrode are identified, and a specific gravity of each of the materials is investigated in a handbook and the like. Next, a sample of 5 cm square is cut out from the negative electrode. This is observed by cross-sectional SEM. A thickness of the negative electrode current collector is obtained from a cross-sectional SEM image, and a weight of the negative electrode current collector is obtained from the obtained thickness and the specific gravity of the negative electrode current collector. Next, a weight of the cut-out sample is measured, and the previously obtained weight of the negative electrode current collector is subtracted from the measured weight to obtain a weight of the negative-electrode-mixture layer. A weight per unit area of the negative-electrode-mixture layer can be obtained by dividing the obtained weight of the negative-electrode-mixture layer by an area of the sample, i.e., 25 cm².

When the thickness of the negative-electrode-mixture layer is less than 5 μm, the self-discharge speed of the nonaqueous electrolyte battery may be increased. On the other hand, when the thickness of the negative-electrode-mixture layer is greater than 50 μm, the movement distances of ions and electrons in the negative electrode mixture layer are increased. Thus, in this case, ion conductivity and electron conductivity may be decreased, and, as a result, the internal resistance of a nonaqueous electrolyte may be increased.

When the weight per unit area of the negative electrode mixture layer is less than 15 g/m², the capacity of the second battery per a volume is decreased. Therefore, in this case, a capacity that can be used in the battery system during rapid charge is decreased. When the weight per unit area of the negative-electrode-mixture layer is greater than 100 g/m², a negative electrode active material is present in an excessive amount on the surface of the negative-electrode-mixture layer to cause an increase in resistance. As a result, a voltage change during rapid charge is increased, and a capacity that can be used by the second battery is decreased. Therefore, the ability of the whole battery system to be rapidly charged is decreased.

The negative-electrode-mixture layer having the weight per unit area and the thickness can have a density in a range of $3 \times 10^5$ g/m³ to $20 \times 10^6$ g/m³. Such a negative-electrode-mixture layer can exhibit both excellent ion conductivity and electron conductivity. Because of this, the second battery including such a negative electrode including the negative-electrode-mixture layer can show a low internal resistance value. The second battery capable of showing a low internal resistance value can suppress a change in a voltage between terminals when a current flows.

Thus, the nonaqueous electrolyte battery included in the second battery can exhibit excellent life characteristics, excellent safety, and excellent input and output characteristics. In particularly, the nonaqueous electrolyte battery included in the second battery can exhibit excellent rapid-charge characteristics, and therefore, even when the nonaqueous electrolyte battery is rapidly charged, the nonaqueous electrolyte battery can suppress a steep voltage change.

And, the nonaqueous electrolyte battery included in the second battery can show a low internal resistance value.

The second battery including such a nonaqueous electrolyte battery provides a small change in the open-circuit voltage depending on an SOC and has a low internal resistance value. Therefore, a steep change in a voltage between terminals of the first battery including the lead storage battery connected in parallel with the second battery can be suppressed. Therefore, in the battery system according to an embodiment, the second battery can prevent the deterioration of the first battery caused by the change in the voltage between terminals.

On the other hand, the first battery can be charged and discharged at some voltage of SOC in which the change in the open-circuit voltage of the second battery is large. Therefore, at the SOC in which the change in the open-circuit voltage of the second battery is large, the change in the voltage between terminals of the second battery can be suppressed by the first battery.

In addition, the second battery included in the battery system according to the embodiment can show a low internal resistance value, as described above. Since the battery system according to the embodiment can have excellent life characteristics, a resistance increase caused by the deterioration of the first battery or the second battery can be suppressed. Because of these, the battery system according to the embodiment can decrease a difference between a charge voltage and a discharge voltage during a charge-and-discharge cycle. The battery having the small voltage difference during the charge-and-discharge cycle can exhibit a high average charge-and-discharge efficiency.

The battery exhibiting a high average charge-and-discharge efficiency can actually charge most of electric energy rapidly input into the battery. On the other hand, in a battery exhibiting a low average charge-and-discharge efficiency, most of the rapidly input electric energy is released to the outside of the battery as thermal energy. Therefore, the electric energies actually charged by the battery exhibiting a low charge-and-discharge efficiency are less than rapidly-input electric energies by a part lost as the thermal energies. Thus, an electric amount actually rapidly-charged by the battery exhibiting a high average charge-and-discharge efficiency can be made greater than that rapidly-charged by the battery exhibiting a low average charge-and-discharge efficiency. In other words, the battery exhibiting a high average charge-and-discharge efficiency can output more parts of the rapidly-input electric energy as electric energy, as compared with the battery exhibiting a low average charge-and-discharge efficiency.

The difference in amount of the electric energy which can be actually charged due to the difference in the average charge-and-discharge efficiency in the case of charge at a large current is greater than that in the case of charge at a small current.

Furthermore, in the battery system according to the embodiment, a ratio of a battery capacity of the second battery to a battery capacity of the first battery is in a range of 1/133 to 1/2.

A capacity of the lead storage battery included in the first battery can be measured by a method described in JIS C8701, for example.

A capacity of the nonaqueous electrolyte battery included in the second battery and using lithium titanate for the negative electrode can be measured by, for example, subjecting a battery charged at a constant voltage of 2.8 V to discharge to a predetermined voltage of 1.5 V.

The battery system in which the battery capacity of the first battery and the battery capacity of the second battery have the above relationship can suppress a change in a voltage of the whole system since the first battery has a comparatively large capacity and can sufficiently suppress the change in the voltage between terminals of the second battery.

The battery system in which the battery capacity of the first battery and the battery capacity of the second battery have the above relationship can reduce costs since the battery capacity of the first battery including a comparatively low-cost lead storage battery is greater than the battery capacity of the second battery including a comparatively high-cost nonaqueous electrolyte battery using lithium titanate for the negative electrode.

In the battery system in which the battery capacity of the first battery and the battery capacity of the second battery have the above relationship, the battery capacity of the second battery capable of exhibiting rapid-charge characteristics is sufficient for the whole battery system to exhibit rapid-charge characteristics.

When the ratio of the battery capacity of the second battery to the battery capacity of the first battery is greater than 1/2, it is difficult for the first battery to sufficiently suppress the change in the voltage between terminals of the second battery. When the ratio of the battery capacity of the second battery to the battery capacity of the first battery is greater than 1/2, relatively more high-cost second batteries are included. As a result, cost-effectiveness is decreased.

When the ratio of the battery capacity of the second battery to the battery capacity of the first battery is less than 1/133, relatively less second batteries capable of exhibiting rapid-charge characteristics are included. As a result, it is difficult for the whole battery system to exhibit rapid-charge characteristics.

The ratio of the battery capacity of the second battery to the battery capacity of the first battery is more preferably in a range of 1/100 to 1/3.

The nonaqueous electrolyte battery included in the second battery may have a nominal voltage of (12/n) V or (24/n) V (n is an integer of 1 or more). The battery module in which the second battery includes a number n of such nonaqueous electrolyte batteries in series can have the same nominal voltage as that of the first battery. In this case, a DC-DC converter is not required for connecting the first battery and the second battery in parallel with each other.

In the battery system according to the embodiment, the positive electrode of the second battery preferably contains a first positive electrode active material and a second positive electrode active material.

The first positive electrode active material is a compound described above, having a spinel structure and represented by $LiMn_{2-x}M(a)_xO_4$.

The second positive electrode active material is a compound represented by $LiCo_{1-y}M(b)_yO_2$ wherein M(b) includes at least one element selected from the group consisting of Ni, Al, Mn, Cr, Fe, Nb, Mg, B and F, and y is in a range of $0 \leq y \leq 0.3$.

Such a second positive electrode active material makes a voltage change at a state right before the full charge of the battery and a voltage change at a state right before full discharge of the battery milder and successive, and enable the detection of the full charge and the full discharge.

Figure 1:
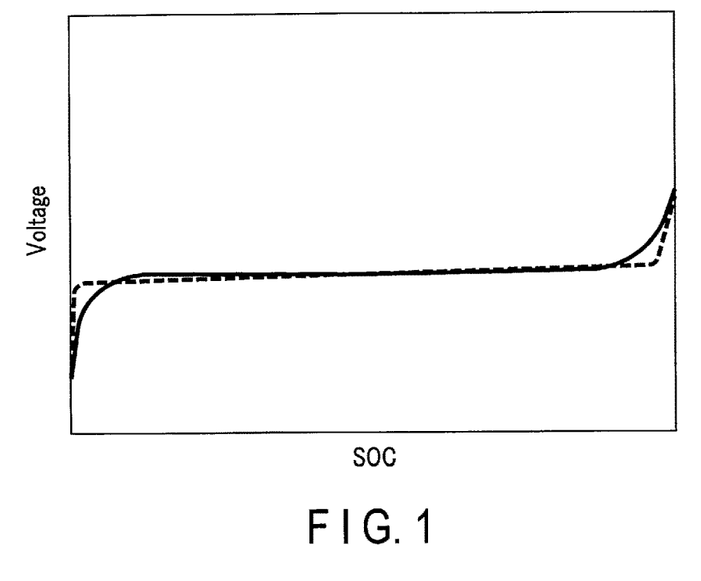
FIG. 1 is a graph schematically showing, as a solid line, the relationship between an SOC and a voltage of a nonaqueous electrolyte battery including a positive electrode containing a first positive electrode active material and a second positive electrode active material, and schematically showing, as a dashed line, the relationship between an SOC and a voltage of a nonaqueous electrolyte battery including a positive electrode containing a first positive electrode active material and not containing a second positive electrode active material.

For example, in FIG. 1, the relationship between an SOC and a voltage of a nonaqueous electrolyte battery including a positive electrode containing a first positive electrode active material and a second positive electrode active material is schematically shown as a solid line, and the relationship between an SOC and a voltage of a nonaqueous electrolyte battery including a positive electrode containing a first positive electrode active material and not containing a second positive electrode active material is schematically shown as a dashed line. As is evident from FIG. 1, the nonaqueous electrolyte battery including the positive electrode containing the second positive electrode active material can provide a milder successive change than that provided by the nonaqueous electrolyte battery including the positive electrode not containing the second positive electrode active material, and enable the detection of the full charge and the full discharge.

When y is less than 0.3, the degradation of the life characteristics of the nonaqueous electrolyte battery included in the second battery can be prevented.

Examples of the second positive electrode active material include $LiCoO_2$.

In the nonaqueous electrolyte battery included in the second battery, the positive electrode preferably contains the first positive electrode active material described above and the second positive electrode active material described above in a weight ratio of 95:5 to 30:70.

When the amount of the first positive electrode active material is 95% by weight or less, the full charge and full discharge of the battery can be easily preliminarily detected. As a result, the frequency of a change in the voltage of the first battery to a voltage close to that at an overcharge state or that at an overdischarge state can be suppressed. Eventually, the degradation of the life characteristics of the first battery can be further suppressed. This leads to the prevention of the life loss of the whole battery system. When the amount of the first positive electrode active material is 30% by weight or more, an SOC range showing a substantially constant voltage is sufficiently wide. As a result, the capacity of the second battery can be sufficiently used, and the rapid-charging capacity of the whole battery system can be sufficiently secured.

Next, a nonaqueous electrolyte battery which can be included in the second battery included in the battery system according to the embodiment will be described.

The nonaqueous electrolyte battery can further include a separator in addition to the positive electrode and negative electrode described above. The positive electrode, the negative electrode, and the separator can constitute an electrode group. In the electrode group, the separator is interposed between the positive electrode and the negative electrode.

The battery can also further include a case accommodating the electrode group.

The case can further accommodate a nonaqueous electrolyte. The electrode group can be impregnated with the nonaqueous electrolyte accommodated in the case.

The battery can also further include a positive electrode terminal and a negative electrode terminal fixed to the case. The positive electrode terminal and the negative electrode terminal may be electrically connected to the electrode group.

Next, each of constituents of a nonaqueous electrolyte battery which can be included in a second battery will be described.

1. Positive Electrode

A positive electrode can include a positive electrode current collector.

The positive electrode current collector is preferably an aluminum foil or an aluminum alloy foil containing at least one element selected from Mg, Ti, Zn, Ni, Cr, Mn, Fe, Cu, and Si.

The positive electrode can further include a positive-electrode-mixture layer formed on the positive electrode current collector. The positive-electrode-mixture layer can contain the above-described positive electrode active material or the above-described first positive electrode active material and second positive electrode active material.

The positive-electrode-mixture layer can further contain a positive electrode binder and a positive electrode conductive agent, in addition to the above-described positive electrode active material or the above-described first positive electrode active material and second positive electrode active material.

The positive electrode binder is added with an aim to bind the positive electrode active material and the positive electrode current collector. Examples of the positive electrode binder include polytetrafluoro ethylene (PTFE), polyvinylidene fluoride (PVdF), and a fluororubber.

The positive electrode conductive agent is added as necessary with an aim to improve current-collecting performance and also to reduce contact resistance between the positive electrode active material and the positive electrode current collector. Examples of the positive electrode conductive agent include carbon materials such as acetylene black, carbon black, and graphite.

It is preferable to blend the positive electrode active material and the positive electrode binder in the ratio of 80% by mass or more and 98% by mass or less, and 2% by mass or more and 20% by mass or less respectively in the positive-electrode-mixture layer. By setting the amount of the positive electrode binder to 2% by mass or more, a sufficient electrode strength can be obtained. By setting the amount of the positive electrode binder to 20% by mass or less, the content of an insulating material in the positive electrode can be reduced so that internal resistance can be reduced.

When the conductive agent is added, it is preferable to blend the positive electrode active material, the positive electrode binder, and the positive electrode conductive agent in the ratio of 77% by mass or more and 95% by mass or less, 2% by mass or more and 20% by mass or less, and 3% by mass or more and 15% by mass or less, respectively. By setting the amount of the positive electrode conductive agent to 3% by mass or more, the aforementioned effect can be sufficiently achieved. By setting the amount of the positive electrode conductive agent to 15% by mass or less, the decomposition of a nonaqueous electrolyte on the surface of the positive electrode conductive agent in high-temperature storage can be reduced.

The positive electrode is produced by suspending, for example, the positive electrode active material, the positive electrode binder, and the positive electrode conductive agent which is added as necessary, in an appropriate solvent to prepare a slurry, coating the positive electrode current collector with the slurry and drying the slurry to form the positive-electrode-mixture layer, and pressing the positive-electrode-mixture layer. Alternatively, the positive electrode may also be produced by shaping the positive electrode active material, the positive electrode binder, and the positive electrode conductive agent, which is added as necessary, into a pellet shape as the positive-electrode-mixture layer and arranging the positive-electrode-mixture layer on the positive electrode current collector.

2. Negative Electrode

A negative electrode includes a negative electrode current collector and a negative-electrode-mixture layer formed on the negative electrode current collector, as described above.

As the negative electrode current collector, a material can be used which is electrochemically stable in a potential at which lithium titanate can absorb or release lithium. The negative electrode current collector is preferably made of copper, nickel, stainless, or aluminum, or an aluminum alloy containing one or more elements selected from Mg, Ti, Zn, Mn, Fe, Cu, and Si. The thickness of the negative electrode current collector is preferably 5 to 20 µm. The negative electrode current collector having such a thickness can keep a balance between the strength and light-weight performance of the negative electrode.

The negative-electrode-mixture layer can contain a negative electrode binder, and optionally a negative electrode conductive agent, in addition to lithium titanate.

The negative electrode binder is added with an aim to fill up gaps among the dispersed negative electrode active material and also to bind the negative electrode active material and the negative electrode current corrector. Examples of the negative electrode binder include polytetrafluoro ethylene (PTFE), polyvinylidene fluoride (PvdF), fluororubber, and styrene-butadiene rubber.

The negative electrode conductive agent is added with an aim to improve current-collecting performance and also to reduce contact resistance between the negative electrode active material and the negative electrode current collector. Examples of the negative electrode conductive agent include carbon materials such as acetylene black, carbon black, and graphite.

In the negative electrode mixture layer, the negative electrode active material, the negative electrode conductive agent, and the negative electrode binder are preferably blended in the ratio of 68% by mass or more and 96% by mass or less, 2% by mass or more and 16% by mass or less, and 2% by mass or more and 16% by mass or less. By setting the amount of the negative electrode conductive agent to 2% by mass or more, current-collecting performance of the negative electrode layer can be further improved. By setting the amount of the negative electrode binder to 2% by mass or more, sufficient binding properties of the negative electrode active material-containing layer and the negative electrode current collector are obtained so that excellent cycle characteristics can be expected. On the other hand, it is preferable to set the amounts of the negative electrode conductive agent and negative electrode binder to 16% by mass or less from the viewpoint of achieving higher capacities.

The negative electrode is produced by, for example, suspending lithium titanate, the negative electrode binder, and the negative electrode conductive agent in a solvent used widely to prepare a slurry, coating a current collector with the slurry and drying the slurry to form a negative-electrode-mixture layer, and pressing the negative-electrode-mixture layer. Alternatively, the negative electrode may also be produced by shaping lithium titanate, the negative electrode binder, and the negative electrode conductive agent into a pellet shape as a negative-electrode-mixture layer and arranging the negative-electrode-mixture layer on a negative electrode current collector.

3. Separator

Examples of the separator may include a porous film containing polyethylene, polypropylene, cellulose, or polyvinylidene fluoride (PVdF) or nonwoven fabric made of a synthetic resin. Among others, a porous film containing polyethylene or polypropylene can improve safety because the porous film melts at a predetermined temperature to be able to shut off a current.

4. Nonaqueous Electrolyte

The nonaqueous electrolyte may be, for example, a liquid nonaqueous electrolyte prepared by dissolving an electrolyte in an organic solvent or a gel-like nonaqueous electrolyte prepared by forming a composite of a liquid electrolyte and a polymer material.

The liquid nonaqueous electrolyte is preferably prepared by dissolving an electrolyte in an organic solvent in the concentration of 0.5 mol/L or more and 2.5 mol/L or less.

Examples of the electrolyte to be dissolved in an organic solvent include lithium salts such as lithium perchlorate ($LiClO_4$), lithium hexafluorophosphate ($LiPF_6$), lithium tetrafluoroborate ($LiBF_4$), lithium hexafluoroarsenide ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte is preferably resistant to oxidation even at a high potential, and $LiPF_6$ is most preferable.

Examples of the organic solvent include a cyclic carbonate such as propylene carbonate (PC), ethylene carbonate (EC), or vinylene carbonate; a chain carbonate such as diethyl carbonate (DEC), dimethyl carbonate (DMC), and methyl ethyl carbonate (MEC); a cyclic ether such as tetrahydrofuran (THF), 2-methyl tetrahydrofuran (2MeTHF), and dioxolane (DOX); a chain ether such as dimethoxy ethane (DME) and diethoxy ethane (DEE); γ-butyrolactone (GBL), acetonitrile (AN), and sulfolane (SL). These organic solvents can be used alone or as a mixed solvent.

Examples of the polymeric material include polyvinylidene fluoride (PVdF), polyacrylonitrile (PAN), and polyethylene oxide (PEO).

Alternatively, a ordinary-temperature molten salt (ionic melt), polymeric solid electrolyte, or inorganic solid electrolyte each of which contains lithium ions may be used as the nonaqueous electrolyte.

The ordinary-temperature molten salt (ionic melt) refers to, among organic salts constituted of combinations of organic cations and anions, compounds which can exist as a liquid at ordinary temperature (15 to 25° C.). The ordinary-temperature molten salt includes an ordinary-temperature molten salt which solely exists as a liquid, an ordinary-temperature molten salt which becomes a liquid after being mixed with an electrolyte, and an ordinary-temperature molten salt which becomes a liquid after being dissolved in an organic solvent. In general, the melting point of the ordinary-temperature molten salt used in the nonaqueous electrolyte battery is 25° C. or below. The organic cations generally have a quaternary ammonium group.

5. Case

As a case, for example, a metal case having a thickness of 1 mm or less can be used. The metal case has a thickness of, more preferably 0.5 mm or less, and still more preferably 0.2 mm or less.

The shape of the case may be flat-type (thin), square-type, cylindrical-type, coin-type, and button-type and the like. The case can take various forms depending on the battery size.

The metal case is made of aluminum or an aluminum alloy and the like. As the aluminum alloy, an alloy containing an element such as magnesium, zinc, or silicon is preferable. If a transition metal such as iron, copper, nickel, or chromium is contained in the alloy, the content thereof is preferably set to 1% by mass or less.

Alternatively, the case may be made of laminate film.

6. Structure and Shape of Electrode Group

The electrode group can adopt any structure in which a positive electrode active material and a negative electrode active material are opposed to each other across a separator.

For example, the electrode group can have a stack structure. The stack structure has a structure in which a positive electrode and a negative electrode each of which is described above are stacked with a separator sandwiched therebetween.

Alternatively, the electrode group can have a wound structure. The wound structure is a structure obtained by stacking a positive electrode and a negative electrode with a separator sandwiched between the positive and negative electrodes as described above, and winding a stacked product thus obtained in a spiral form or a flat spiral form.

The shape of the electrode group as a whole can be determined on fitting to the case in which the electrode group is accommodated.

Next, an example of a battery system according to an embodiment will be described with reference to the drawings.

Figure 2:
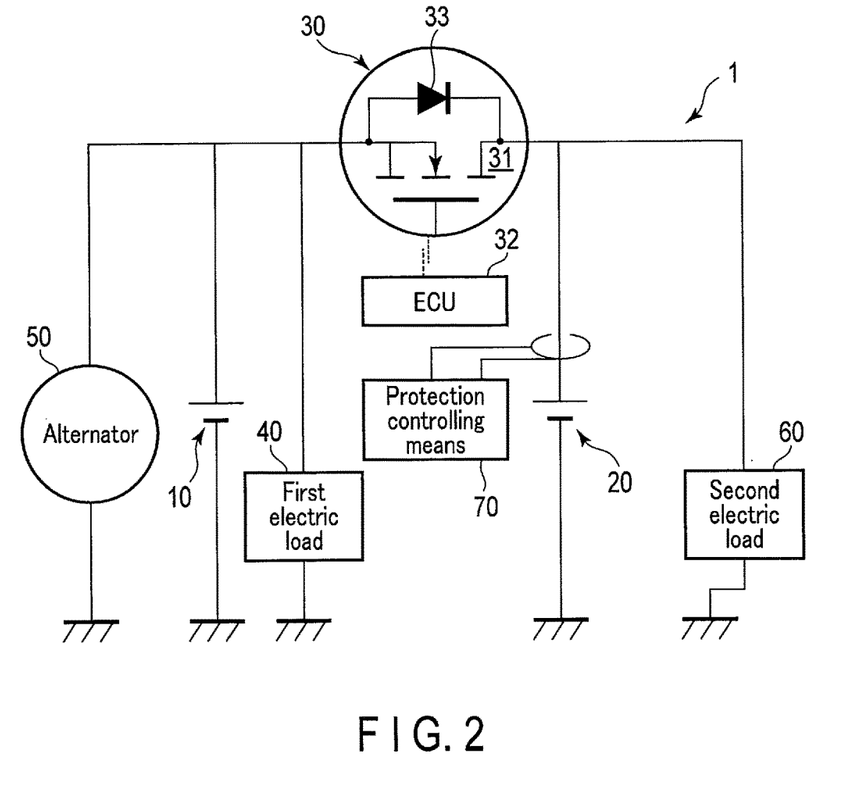
FIG. 2 shows a circuit diagram of an example of a battery system according to an embodiment.
Figure 3:
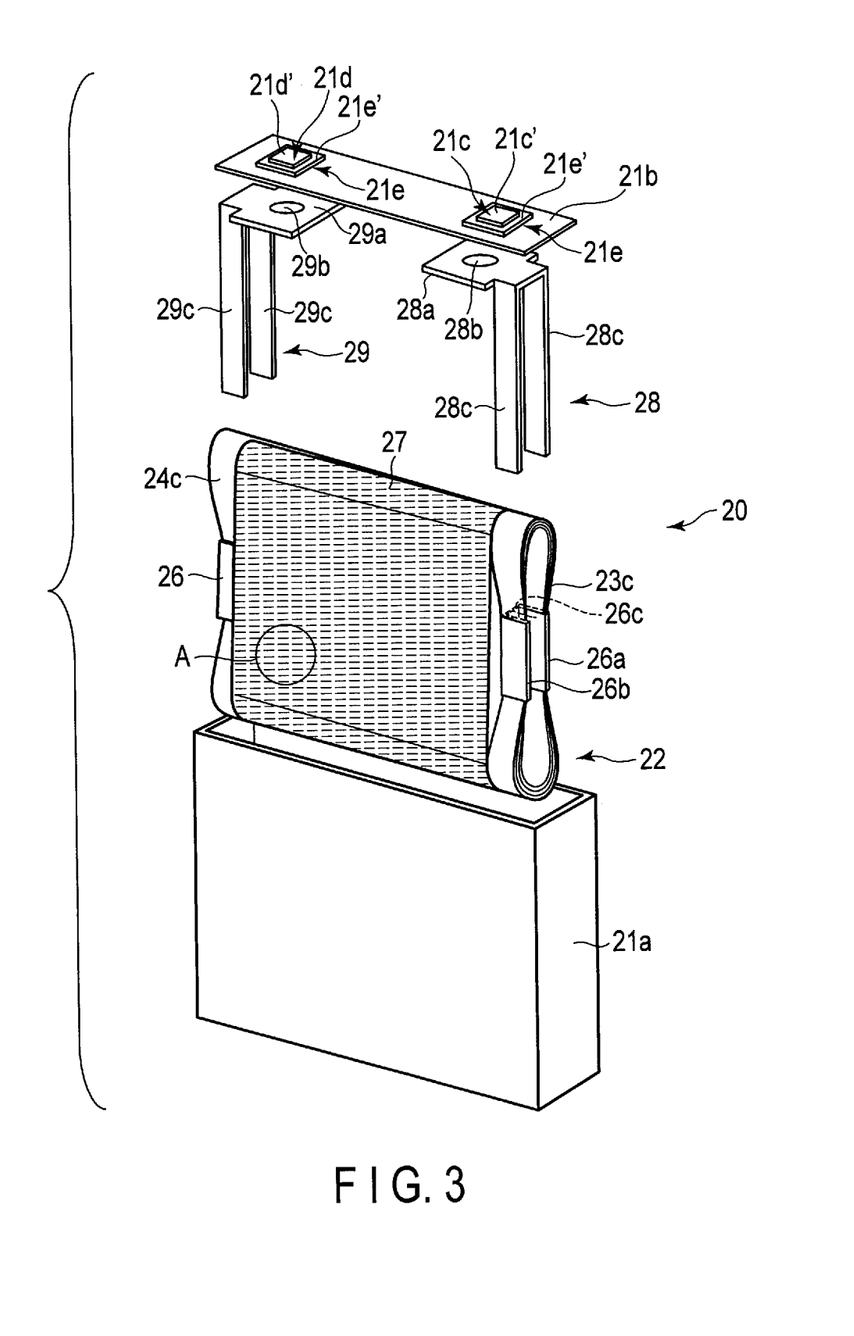
FIG. 3 is an exploded perspective view of a nonaqueous electrolyte battery included in a second battery shown in FIG. 2.
Figure 4:
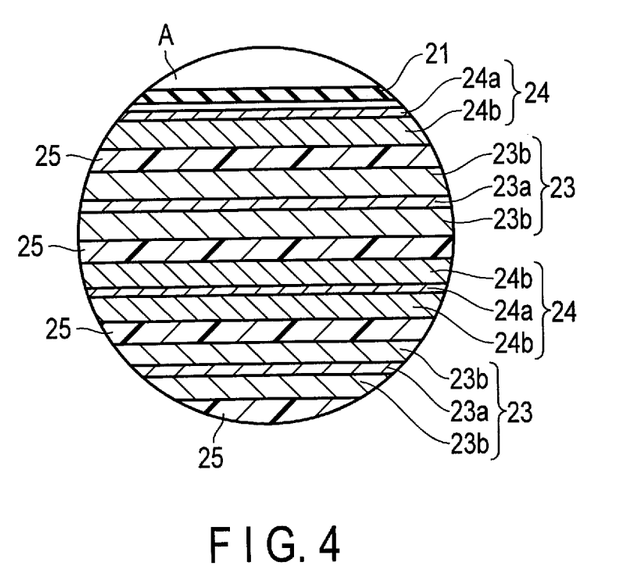
FIG. 4 is an enlarged sectional view of a part A of FIG. 3.
Figure 5:
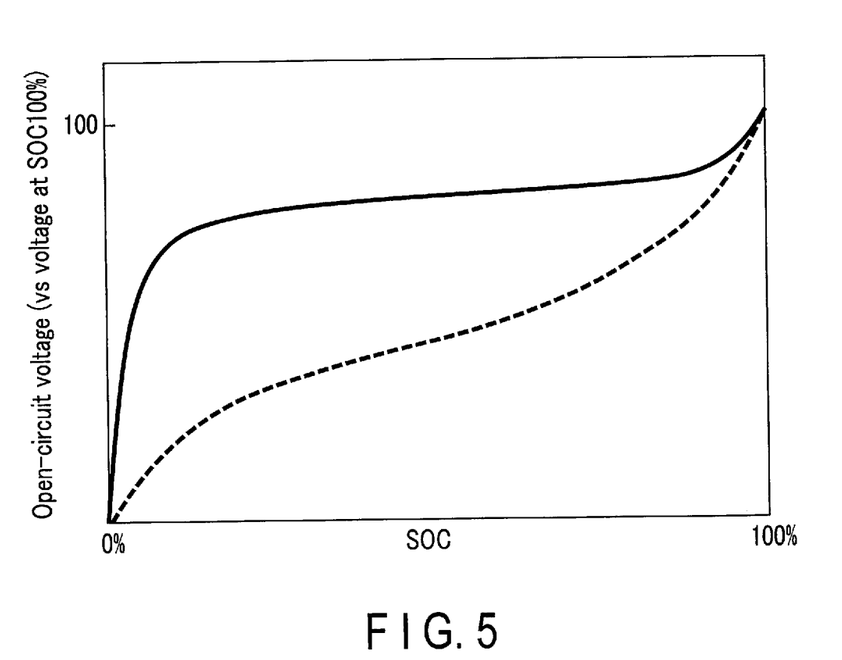
FIG. 5 is a graph showing a change in an open-circuit voltage as a function of a state of charge SOC, for the second battery which can be included in the battery system according to the embodiment and other battery.

FIG. 2 shows a circuit diagram of an example of the battery system according to the embodiment. FIG. 3 is an exploded perspective view of a nonaqueous electrolyte battery included in a second battery shown in FIG. 2. FIG. 4 is an enlarged sectional view of a part A of FIG. 3. FIG. 5 is a graph showing a change in an open-circuit voltage as a function of a charge of state SOC, for each of the second battery which can be included in the battery system according to the embodiment and other battery.

A battery system 1 shown in FIG. 2 includes a first battery 10 and a second battery 20.

The first battery 10 is a battery module including six lead storage batteries. Each of these lead storage batteries has a nominal voltage of 2 V, and these are connected in series with each other. Therefore, the nominal voltage of the first battery 10 is 12 V.

The second battery 20 is connected in parallel with the first battery 10. The second battery 20 includes five nonaqueous electrolyte batteries 20 each using lithium titanate for a negative electrode 24. Each of the nonaqueous electrolyte batteries 20 has a nominal voltage of 2.4 V, and these are connected in series with each other. Therefore, the second battery 20 has the same nominal voltage (12 V) as that of the first battery.

In the battery system 1 shown in FIG. 2, a ratio of a battery capacity of the second battery 20 to a battery capacity of the first battery 10 is in a range of 1/133 to 1/2.

Each of the nonaqueous electrolyte batteries 20 included in the second battery 20 includes a case 21a having an opening, a cap 21b welded to the opening of the case 21a, a flat-type electrode group 22 accommodated in the case 21a, and a nonaqueous electrolyte (not shown) accommodated in the case 21a, as shown in FIG. 3. The electrode group 22 is impregnated with the nonaqueous electrolyte.

The flat-type electrode group 22 includes a belt-like positive electrode 23 having a pair of long sides, and a belt-like negative electrode 24 having a pair of long sides. As shown in FIG. 4, the positive electrode 23 and the negative electrode 24 are wound with a belt-like separator 25 having a pair of long sides sandwiched therebetween. The positive electrode 23, the negative electrode 24, and the separator 25 are wound in a state where the directions of the long sides thereof coincide with each other.

The positive electrode 23 includes a positive electrode current collector 23a and a positive-electrode-mixture layer 23b supported on the surface of the positive electrode current collector 23a. The positive-electrode-mixture layer 23b contains the positive-electrode-active material described above.

As shown in FIG. 3, the positive current collector 23a includes a belt-like portion 23c having a surface onto which the positive-electrode-mixture layer 23b is not supported. The positive current collector 23a has 2 kinds of potion. One is coated, and the other 23c is non-coated. On the coated portion, there is the positive-electrode-mixture layer 23b. The portion 23c extends in a direction parallel to the long side of the positive electrode current collector 23a. The portion 23c can be used as a positive electrode current collecting tab 23c.

The negative electrode 24 includes a negative electrode current collector 24a, and a negative-electrode-mixture layer 24b supported on the surface of the negative electrode current collector 24a, as shown in FIG. 4. The negative-electrode-mixture layer 24b contains lithium titanate. The negative-electrode-mixture layer 24b has a weight per unit area of 15 g/m$^2$ to 100 g/m$^2$ and a thickness of 5 μm to 50 μm.

The negative electrode current collector 24a includes a belt-like portion 24c having a surface onto which the negative-electrode-mixture layer 24b is not supported. The negative current collector 24a has 2 kinds of potion. One is coated, and the other 24c is non-coated. On the coated portion, there is the positive-electrode-mixture layer 24b. The portion 24c extends in a direction parallel to the long side of the negative electrode current collector 24a. The portion 24c can be used as a negative electrode current collecting tab 24c.

The positive electrode 23, the separator 25, and the negative electrode 24 are wound in a state where the positions of the positive electrode 23 and negative electrode 24 are displaced to each other so that the positive electrode current collecting tab 23c is projected from the separator 25 in a winding axial direction of the electrode group 22 and the negative electrode current collecting tab 24c is projected from the separator 25 in a direction opposite to the positive electrode current collecting tab 23c. As shown in FIG. 3, in such winding state of the electrode group 22, the spirally wound positive electrode current collecting tab 23c is projected from one end face, and the spirally wound negative electrode current collecting tab 24c is projected from the other end face.

In the electrode group 22, anything will do, so long as a mixture layer of one electrode is present on a portion facing a mixture layer of the other electrode via the separator 25. A mixture layer of one electrode may not be provided on a portion not facing a mixture layer of the other electrode via the separator 25. Therefore, as shown in FIG. 4, the negative electrode current collector 24a has a surface located on the outermost side of the electrode group 22 and facing the case 21a, and the negative electrode mixture layer 24b may not be supported on the surface.

As shown in FIG. 3, the flat-type electrode group 22 includes two sandwiching members 26. The sandwiching member 26 includes a first sandwiching part 26a, a second sandwiching part 26b, and a connecting part 26c connecting the first and second sandwiching parts 26a and 26b. Since the positive electrode current collecting tab 23c and the negative electrode current collecting tab 24c are wound so as to form a flattened configuration, each of the positive electrode current collecting tab 23c and the negative electrode current collecting tab 24c has a space formed at a winding center. The connecting part 26c of one sandwiching member 26 is disposed in the space in the positive electrode current collecting tab 23c. The connecting part 26c of the other sandwiching member 26 is disposed in the space in the negative electrode current collecting tab 24c. In such an arrangement, each of the positive electrode current collecting tab 23c and the negative electrode current collecting tab 24c has a part sandwiched by the parts of the first sandwiching part 26a and other part sandwiched by the parts of the second sandwiching part 26b with the connecting part 26c as a boundary. For each the positive electrode current collecting tab 23c and the negative electrode current collecting tab 24c, the one part faces the other part with the space in the positive electrode current collecting tab 23c or the negative electrode current collecting tab 24c sandwiched therebetween.

The outermost circumference of the electrode group 22 has a portion excluding the positive electrode current collecting tab 23c and the negative electrode current collecting tab 24c. The portion of the outermost circumference of the electrode group 22 is covered with an insulating tape 27.

The cap 21b has a rectangle shape. The cap 21b has two through holes which are not shown.

An injection port (not shown) for injecting a nonaqueous electrolyte is further opened in the cap 21b. The injection port is sealed by a sealing cap (not shown) after the electrolyte is injected.

A battery shown in FIG. 3 further includes a positive electrode lead 28, a positive electrode terminal 21c, a negative electrode lead 29, and a negative electrode terminal 21d.

The positive electrode lead 28 includes a connecting plate 28a for electrically connecting the positive electrode lead 28 to the positive electrode terminal 21c, a through hole 28b opened in the connecting plate 28a, and strip-like current-collecting parts 28c divided into two branches from the connecting plate 28a and extending downward. The sandwiching member 26 sandwiching the positive electrode current collecting tab 23c, and the positive electrode current collecting tab 23c are sandwiched between the two current-collecting parts 28c of the positive electrode lead 28, and the current-collecting parts 28c are electrically connected to the sandwiching member 26 by welding.

The negative electrode lead 29 includes a connecting plate 29a for electrically connecting the negative electrode lead 29 to the negative electrode terminal 21d, a through hole 29b opened in the connecting plate 29a, and strip-like current-collecting parts 29c divided into two branches from the connecting plate 29a and extending downward. The sandwiching member 26 sandwiching the negative electrode current collecting tab 24c, and the negative electrode current collecting tab 24c are sandwiched between the two current-collecting parts 29c of the negative electrode lead 29, and the current-collecting parts 29c are electrically connected to the negative electrode current collecting tab 24c by welding.

Examples of a method for electrically connecting each of the positive electrode lead 28 and the negative electrode lead 29 to each of the positive electrode current collecting tab 23c and the negative electrode current collecting tab 24c include, but are not particularly limited to, welding such as ultrasonic welding and laser welding.

The positive electrode terminal 21c has a rivet shape including a flange part 21c' and an axial part (not shown). The flange part 21c' of the positive electrode terminal 21c is placed on an outer insulating member 21e. The outer insulating member 21e includes a flange part 21e' and an axial part (not shown). The axial part of the outer insulating member 21e has a hollow structure including a through hole starting from an opening formed in the flange part 21e' and extending in the extension direction. The axial part of the outer insulating member 21e is inserted into one through hole of the cap 21b. The axial part of the positive electrode terminal 21c passes through the through hole of the axial part of the outer insulating member 21e.

The axial part of the positive electrode terminal 21c passing through the axial part of the outer insulating member 21e penetrates an inner insulating member which is not shown, and passes through the through hole 28b opened in the connecting plate 28a of the positive electrode lead 28.

The tip of the axial part of the positive electrode terminal 21c passing through the through hole 28b is caulked. Thus, the positive electrode terminal 21c and the positive electrode lead 28 are caulked to the cap 21b with the outer insulating member 21e and an inner insulating member which is not shown sandwiched between the positive electrode terminal 21c and the positive electrode lead 28. In such an arrangement, the positive electrode terminal 21c and the positive electrode lead 28 are electrically connected to each other, and are electrically insulated from the cap 21b.

The negative electrode terminal 21d has a rivet shape including a flange part 21d' and an axial part (not shown). The flange part 21d' of the negative electrode terminal 21d is placed on the outer insulating member 21e. The outer insulating member 21e includes a flange part 21e' and an axial part (not shown). The axial part of the outer insulating member 21e has a hollow structure including a through hole starting from an opening formed in the flange part 21e' and extending in the extension direction. The axial part of the outer insulating member 21e is inserted into a through hole through which the axial part of the positive electrode terminal 21c does not pass, in the through holes of the cap 21b. The axial part of the negative electrode terminal 21d passes through the through hole of the axial part of the outer insulating member 21e.

The axial part of the negative electrode terminal 21d passing through the axial part of the outer insulating member 21e penetrates an inner insulating member which is not shown, and passes through the through hole 29b opened in the connecting plate 29a of the negative electrode lead 29.

The tip of the axial part of the negative electrode terminal 21d passing through the through hole 29b is caulked. Thus, the negative electrode terminal 21d and the negative electrode lead 29 are caulked to the cap 21b with the outer insulating member 21e and the inner insulating member, which is not shown, sandwiched between the negative electrode terminal 21d and the negative electrode lead 29. In such an arrangement, the negative electrode terminal 21d and the negative electrode lead 29 are electrically connected to each other, and electrically insulated from the cap 21b.

As shown by a solid line in FIG. 5, the nonaqueous electrolyte battery included in the second battery 20 described above can show a substantially constant open-circuit voltage over a wide SOC range starting from a full charge state. That is, the second battery 20 can suppress a change in a voltage between terminals even when an SOC is steeply increased by rapid charge.

On the other hand, in a battery mainly using a $LiNiO_2$-based or $LiCoO_2$-based active material as the positive electrode active material, an open-circuit voltage is largely changed in accordance with a change in an SOC, as shown by a dashed line in FIG. 5. Therefore, when the SOC is steeply increased by rapid charge in the battery, the voltage between terminals is largely changed.

In the battery system 1 shown in FIG. 2, the first battery 10 and the second battery 20 are connected in parallel with each other via a circuit switching means 30.

The circuit switching means 30 includes a semiconductor switch 31. The semiconductor switch 31 includes a metal-oxide-semiconductor junction field effect transistor (MOSFET), and can switch between conduction and shutoff of electrons via this transistor. The switching between conduction and shutoff of electrons via the semiconductor switch 31 is controlled by an electric control means (ECU) 32.

The voltage between terminals of the first battery 10 is monitored by a sensor which is not shown, and the information thereof is sent to the electronic control means 32.

The battery system 1 shown in FIG. 2 further includes a first electric load 40 and an alternator 50. The first electric load 40 and the alternator 50 are connected in parallel with the first battery 10 without intervention of the semiconductor switch 31. The first electric load 40 and the alternator 50 are connected in parallel with the second battery 20 via the semiconductor switch 31.

The first electric load 40 is an electric load which is not sensitive to a change in an applied voltage.

The alternator 50 is an AC generator which transduces mechanical energy into electric energy. The alternator 50 can send an alternating current to a rectifier which is not shown. The rectifier serves to transduce the received alternating current into a direct current, and to flow the direct current to the battery system 1. A transmission voltage from the alternator 50 is monitored by a sensor which is not shown, and the information thereof is sent to the electronic control means 32.

The battery system 1 shown in FIG. 2 further includes a second electric load 60. The second electric load 60 is connected in parallel with the second battery 20 without intervention of the semiconductor switch 31. The second electric load 60 is connected in parallel with the first battery 10, the first electric load 40, and the alternator 50 via the semiconductor switch 31.

The second electric load 60 is an electric load which may cause defects when the applied voltage is changed. In the second electric load 60, an operating voltage is set to be adapted to the nominal voltage of the first battery 10.

The battery system shown in FIG. 2 further includes a protection controlling means 70 configured to protect the second battery 20. The protection controlling means 70 can include a means (not shown) configured to monitor a voltage between terminals of the second battery 20, for example. For example, when the voltage between terminals of the second battery 20 is decreased to less than a threshold value, the protection controlling means 70 sends signals to an electronic control means 32 connected to the circuit switching means 30, and permits the conduction of electron from the first battery 10 to the second battery 20 via the semiconductor switch 31, so that the second battery 20 can be prevented from being in an overdischarge state.

The battery system 1 shown in FIG. 2 is a battery system for an automobile, for example.

In the battery system 1 which is a battery system for an automobile, the first electric load 40 includes an air-conditioning unit and a lighting system, for example.

In the battery system 1 which is a battery system for an automobile, the alternator 50 is mechanically connected to an engine of the automobile. The alternator 50 is connected also to a braking system, and can transduce energy generated when the automobile is braked into regeneration energy.

In the battery system 1 which is a battery system for an automobile, the second electric load 60 includes a car navigation device and a sound system, for example.

Next, the electric transmission of the battery system 1 which is a battery system for an automobile will be described.

(1) At the Time of Engine Operating

While the engine of the automobile is operating, the alternator 50 generates electricity, and the electricity thus generated is transduced into a direct current by rectifier which is not shown, and the direct current is sent to the first electric load 40 and the first battery 10.

When the transmission voltage from the alternator 50 is in a range allowable by the second electric load 60 while the engine is operating, the electronic control means 32 sets the semiconductor switch 31 to a "conduction" state, and sends the electricity generated in the alternator 50 to the second battery 20 and the second electric load 60.

A diode 33 as a rectifying means configured to set the direction of a current from the first battery 10 side to the second battery 20 side to a forward direction is parasitic on the semiconductor switch 31. Therefore, even when the semiconductor switch 31 is in a "conduction" state, the electric transmission from the second battery 20 to the first electric load 40 is suppressed by the parasitic diode 33. Because of this, although the second battery 20 has a capacity smaller than that of the first battery 10, the second battery 20 can be prevented from being in an overdischarge state.

When the transmission voltage from the alternator 50 departs from a range allowable by the second electric load 60 while the engine is operating, the electronic control means 32 sets the semiconductor switch 31 to a "shutoff" state, and shuts off the electric transmission from the alternator 50 to the second battery 20 and the second electric load 60. During this period, the second battery 20 sends the electricity to the second electric load 60. As described above, since the second battery 20 has a small change in an open-circuit voltage accompanied by a change in an SOC and a low internal resistance value, the second battery 20 can perform the electric transmission to the second electric load 60 at a substantially constant voltage.

(2) At the Time of Automobile Braking

When the automobile is braked, the alternator 50 momentarily flows a current larger than that at the time of engine operating to the battery system 1. In this case, the electronic control means 32 sets the semiconductor switch 31 to an "conduction" state.

In the battery system 1, the second battery 20 has internal resistance lower than that of the first battery 10. Furthermore, the second battery 20 is a battery module including nonaqueous electrolyte batteries each of which can be rapidly charged and discharged. Therefore, a high current generated in the alternator 50 when the automobile is braked flows in a larger amount in the second battery 20 than in the first battery 10. Since the second battery 20 has a small change in an open-circuit voltage accompanied by a change in an SOC as described above, the second battery 20 can prevent the open-circuit voltage form largely being changed even when the high current flows to cause a steep increase in the SOC. Therefore, the second battery 20 hardly has a negative effect on the voltage between terminals of the first battery 10 connected in parallel with the second battery 20 even when the SOC is steeply changed, and hardly has a negative effect on the electric transmission to the second electric load 60.

(3) At the Time of Engine Stopping

Since the alternator 50 does not generate electricity when the engine is stopped, the electric transmission from the alternator 50 is not performed. Instead, the first battery 10 and the second battery 20 assume the electric transmission to the first electric load 40 and the second electric load 60.

When the transmission voltage from the first battery 10 is in a range allowable by the second electric load 60, the electronic control means 32 sets the semiconductor switch 31 to a "conduction" state. Thereby, the first battery 10 sends electricity to the first electric load 40 and the second electric load 60. On the other hand, the second battery 20 sends electricity mainly to the second electric load 60 due to a rectifying function of the parasitic diode 33.

When the transmission voltage from the first battery 10 departs from the range allowable by the second electric load 60, the electronic control means 32 sets the semiconductor switch 31 to a "shutoff" state. Therefore, the first battery 10 sends electricity only to the first electric load 40. On the other hand, the second battery 20 sends electricity only to the second electric load 60.

Should be noted that as described above, in the second electric load 60, the operating voltage is set to be adapted to the nominal voltage of the first battery 10. Therefore, in fact, a duration in which the transmission voltage from the first battery 10 departs from the range allowable by the second electric load 60 is very short. Therefore, the electric transmission to the second electric load 60 only by the second battery 20 is also very short. Because of this, although the second battery 20 has a capacity smaller than that of the first battery 10, the second battery 20 can be prevented from being in an overdischarge state.

In the battery system according to the embodiment described above, the nonaqueous electrolyte battery included in the second battery includes the negative electrode containing lithium titanate. The negative-electrode-mixture layer of the negative electrode has a weight per unit area of 15 g/m$^2$ to 100 g/m$^2$ and a thickness of 5 μm to 50 μm. In the nonaqueous electrolyte battery, the positive electrode contains the positive electrode active material $LiMn_{2-x}M(a)_xO_4$. Therefore, the nonaqueous electrolyte battery can be rapidly charged and discharged, and can suppress the change in the open-circuit voltage caused by the SOC change. The nonaqueous electrolyte battery included in the second battery can show a low internal resistance value. Therefore, the nonaqueous electrolyte battery included in the second battery can suppress the change in the voltage between terminals even when the nonaqueous electrolyte battery is rapidly charged and discharged. Because of this, the change in the voltage between terminals of the first battery connected in parallel with the second battery and including the lead storage battery can be suppressed, and the deterioration of the first battery can be suppressed.

Furthermore, in the SOC in which the open-circuit voltage of the nonaqueous electrolyte battery included in the second battery can be largely changed, the first battery can suppress the change in the open-circuit voltage of the second battery. In the battery system according to the embodiment, the battery capacity of the first battery is greater than the battery capacity of the second battery. Therefore, an effect of the first battery of suppressing the change in the open-circuit voltage of the second battery can be sufficiently secured.

Thus, in the battery system according to the embodiment, the first battery and the second battery can mutually suppress a change in the voltage between terminals. Therefore, the battery system according to the embodiment can suppress the change in the voltage as a whole, and can suppress the deterioration of the lead storage battery included in the first battery.

That is, the battery system according to the embodiment can be rapidly charged and discharged, and exhibit excellent life characteristics.

EXAMPLES

The present invention will be described in more detail below with reference to examples, but the present invention is not limited to the examples shown below without deviating from the spirit of the invention.

Example 1

In Example 1, a nonaqueous electrolyte battery 20 shown in FIGS. 3 and 4 was produced by a method described below.

<Production of Positive Electrode 23>

$LiMn_{1.99}Al_{0.01}O_4$ having a spinel structure was provided as a first positive electrode active material. Furthermore, $LiCoO_2$ was provided as a second positive electrode active material. The provided first positive electrode active material and second positive electrode active material were mixed in a weight ratio of 70:30 to obtain a positive electrode active material powder.

Next, the positive electrode active material powder, carbon black, and polyvinylidene fluoride (PVdF) were added in a weight ratio of 100:5:5 into N-methylpyrrolidone, to prepare a positive electrode slurry.

The prepared positive electrode slurry was applied to both surfaces of a belt-like aluminum foil 23a having a pair of long sides. In this case, the positive electrode slurry was not applied to a belt-like region 23c extending in a direction parallel to the long sides of the aluminum foil. Then, the positive electrode slurry applied to the aluminum foil was dried and pressed to obtain a belt-like positive electrode 23 including a positive electrode current collector 23a and a positive-electrode-mixture layer 23b supported thereon. The positive electrode 23 included a belt-like positive electrode current collecting tab 23c extending in a direction parallel to the long sides of the positive electrode current collector 23a and not supporting the positive-electrode-mixture layer 23b. The length and width of the application part of the positive-electrode-mixture layer 23b are shown in the following Table 1.

<Production of Negative Electrode 24>

Spinel type lithium titanate $Li_4Ti_5O_{12}$, carbon black, and polyvinylidene fluoride (PVdF) were added in a weight ratio of 100:5:5 into N-methylpyrrolidone, to prepare a negative electrode slurry.

The prepared negative electrode slurry was applied to both surfaces of a belt-like aluminum foil having a pair of long sides. Then, the negative electrode slurry applied to the aluminum foil was dried and pressed to obtain a belt-like negative electrode 24 including a negative electrode current collector 24a and a negative-electrode-mixture layer 24b supported thereon. The negative electrode 24 included a belt-like negative electrode current collecting tab 24c extending in a direction parallel to the long sides of the negative electrode current collector 24a and not supporting the negative-electrode-mixture layer 24b. The length and width of the application part of the negative-electrode-mixture layer 24b are shown in the following Table 1.

The thickness of the negative-electrode-mixture layer 24b was measured by the above-mentioned method. The thickness was found to be 20 μm. Also, the mass of the negative electrode mixture layer 24b of 5 cm square was measured.

The mass was found to be 0.1 g. Therefore, the weight per unit area of the negative-electrode-mixture layer 24b was 40 g/m².

<Production of Electrode Group 22>

The positive electrode 23 and the negative electrode 24 were stacked with a belt-like separator 25 sandwiched therebetween. In this case, the positive electrode 23, the separator 25, and the negative electrode 24 were stacked so that the positive electrode current collecting tab 23c and the negative electrode current collecting tab 24c were projected in directions opposite to each other from the separator 25. A separator made of polyethylene and having a thickness of 30 μm was used for the separator 25. The length and width of the separator 25 are shown in the following Table 1.

TABLE 1

|  | Length of Application Part in Mixture Layer 23b or 24b | Width of Application Part in Mixture Layer 23b or 24b |
| --- | --- | --- |
| Positive Electrode 23 | 1000 cm | 5 cm |
| Negative Electrode 24 | 1100 cm | 6 cm |
| Separator 25 | 2300 cm | 7 cm |

The obtained stacked product was wound in a spiral form so that the negative electrode 24 was located outside, and was pressed to obtain a flat-type electrode group 22. The flat-type electrode group 22 had spaces formed at the winding centers of the positive electrode current collecting tab 23c and the negative electrode current collecting tab 24c which were projected from the electrode group 22 respectively.

Next, a portion of the electrode group 22 excluding the positive electrode current collecting tab 23c and the negative electrode current collecting tab 24c was covered with an insulating tape 27.

Next, two sandwiching members 26 were provided.

The positive electrode current collecting tab 23c was sandwiched by a first sandwiching part 26a of and a second sandwiching part of a sandwiching member 26, and these were subjected to ultrasonic joining.

Similarly, the negative electrode current collecting tab 24c was sandwiched by a first sandwiching part 26a and a second sandwiching part of another sandwiching member 26, and these were subjected to ultrasonic joining.

<Production of Cap Unit>

A rectangular cap made of aluminum was provided as a cap 21b. A cap 21b has two through holes, which are not shown, and an injection port, which is not shown.

A cap unit including the cap 21b, a positive electrode terminal 21c, a negative electrode terminal 21d, two outer insulating members 21e, two inner insulating members, a positive electrode lead 28, and a negative electrode lead 29 was produced using the above members.

<Connection of Electrode Group 22 with Positive Electrode Terminal 21c and Negative Electrode Terminal 21d>

Next, the sandwiching member 26 sandwiching the positive electrode current collecting tab 23c was sandwiched between two strip-like current-collecting parts 28c of the positive electrode lead 28, and these were subjected to laser welding in this state. Similarly, the sandwiching member 26 sandwiching the negative electrode current collecting tab 24c was sandwiched between two strip-like current-collecting parts 29c of the negative electrode lead 29, and these were subjected to laser welding in this state.

Thus, the electrode group 22, the positive electrode terminal 21c, and the negative electrode terminal 21d were electrically connected.

<Accommodation to Case 21a>

A case having an opening, having a bottomed square-type shape, and made of aluminum was provided as a case 21a.

Next, the flat-type electrode group 22 electrically connected to the positive electrode terminal 21c and the negative electrode terminal 21d of the cap 21b was accommodated in the case 21a. Then, the cap 21b was welded to the opening of the case 21 so as to close the case 21.

<Liquid Injection>

After the electrode group 22 was accommodated, a nonaqueous electrolytic solution was injected into the case 21a through an injection port formed in the cap 21b. As the nonaqueous electrolytic solution, an electrolytic solution obtained by dissolving $LiPF_6$ as an electrolyte in the concentration of 1.5 mol/L in a nonaqueous solvent in which PC and MEC were mixed in the volume ratio of 1:2 was used.

<Sealing>

After the nonaqueous electrolytic solution was injected, the assembly of the nonaqueous electrolyte battery 20 was completed by sealing the injection port of the cap 21b with a sealing cap.

<Initial Charge>

The produced nonaqueous electrolyte battery 20 was subjected to initial charge at a constant current and constant voltage (CCCV) at 3 A and 2.8 V. The nonaqueous electrolyte battery 20 was subjected to initial charge until a current converged on 0.3 A.

[Evaluation]

(Capacity Measurement)

There was measured a quantity of discharged electricity when the nonaqueous electrolyte battery subjected to initial charge was discharged at 3 A until a voltage between terminals became 1.5 V. The measured quantity of discharged electricity was defined as a battery capacity of the nonaqueous electrolyte battery 20. The battery capacity of the nonaqueous electrolyte battery 20 of example 1 was 3 Ah.

(Pulse Cycle Test)

1. Production of Second Battery 20

Five nonaqueous electrolyte batteries 20 were produced and subjected to initial charge. The batteries 20 subjected to initial charge were connected in series with each other, to assemble a second battery 20 as a battery module.

A voltage between terminals of the second battery 20 was measured. The voltage was found to be 12 V.

2. Production of Simple Battery System 1

Next, a first battery 10 was provided. As the first battery 10, a lead storage battery pack having a nominal voltage of 12 V was purchased and used. The lead storage battery pack was a battery module in which six lead storage batteries each having a nominal voltage of 2 V were connected in series with each other.

A battery capacity of the first battery 10 was investigated by a method described in JIS C8701. The battery capacity of the first battery 10 was fond to be 30 Ah.

The first battery 10, the previously produced second battery 20, and an electric load 40 were connected in parallel with each other to produce a simple battery system 1.

3. Test

The simple battery system 1 was rapidly charged and discharged repeatedly at 200 A under an atmosphere of 25° C. for 10 seconds to investigate cycle characteristics. The first battery 10 was taken out every 20,000 cycles, and a reduction in the battery capacity was investigated.

It was at 500,000 cycles that the battery capacity of the first battery 10 was reduced to 80% of the initial battery capacity.

Examples 2 to 15 and Comparative Examples 1 to 6

In each of Examples 2 to 15 and Comparative Examples 1 to 6, a simple battery system 1 was produced according to the same method as that of Example 1 except that the kinds and mixing ratio of a first positive electrode active material and a second positive electrode active material, the battery capacity of a first battery 10, and the thickness and the weight per unit area of a negative-electrode-mixture layer 24b were changed as shown in the following Table 2. Each of simple battery systems 1 was evaluated. Should be noted that, in Table 2, $LiFePO_4$ was described in the column of the first positive electrode active material of Comparative Example 1. However, to be precise, the compound is not the first positive electrode active material. Therefore, the compound is described in the parenthesis. Similarly, in Table 2, $LiNiO_2$ is described in the column of the second positive electrode active material of Comparative Example 5. However, to be precise, the compound is not the second positive electrode active material. Therefore, the compound is described in the parenthesis.

Furthermore, in Comparative Example 6, a simple battery system was produced only by the first battery 10 without using a second battery 20.

The number of cycles at which the battery capacity of the first battery 10 included in the battery system 1 of each of Examples 1 to 15 and Comparative Examples 1 to 6 is reduced to 80% of the initial battery capacity is shown in Table 2.

The average charge-and-discharge efficiency per cycle of the battery system 1 of each of Examples 1 to 15 and Comparative Examples 1 to 6 is shown in the following Table 3.

TABLE 3

|  | Average Charge-and-Discharge Efficiency per Cycle (Wh %) |
|---|---|
| Example 1 | 93 |
| Example 2 | 93 |
| Example 3 | 93 |
| Example 4 | 92 |
| Example 5 | 93 |
| Example 6 | 92 |
| Example 7 | 92 |
| Example 8 | 91 |
| Example 9 | 91 |
| Example 10 | 91 |
| Example 11 | 91 |
| Example 12 | 90 |
| Example 13 | 90 |
| Example 14 | 90 |
| Example 15 | 90 |
| Comparative Example 1 | 75 |
| Comparative Example 2 | 80 |
| Comparative Example 3 | 80 |
| Comparative Example 4 | 75 |

TABLE 2

| | First Positive Electrode Active Material ① | Second Positive Active Material ② | Mixing Ratio of ① to ② (①:②) | Battery Capacity of Second Battery (Ah) (1) | Battery Capacity of First Battery (Ah) (2) | Ratio of Battery Capacity of Second Battery to Battery Capacity of First Battery ((1)/(2)) | Thickness of Negative Electrode Mixture Layer 24b (μm) | Weight per Unit Area of Negative Electrode Mixture Layer 24b (g/m²) | Density of Negative Electrode Mixture Layer 24b (g/m³)[/10⁵] | Number of Cycle after which Battery Capacity of First Battery is reduced to 80% of Initial Battery Capacity |
|---|---|---|---|---|---|---|---|---|---|---|
| Example 1 | $LiMn_{1.99}Al_{0.01}O_4$ | $LiCoO_2$ | 70:30 | 3 | 30 | 1/10 | 20 | 40 | 20 | 500,000 |
| Example 2 | $LiMn_{1.99}Al_{0.01}O_4$ | $LiCoO_2$ | 70:30 | 3 | 300 | 1/100 | 20 | 40 | 20 | 490,000 |
| Example 3 | $LiMn_{1.99}Al_{0.01}O_4$ | $LiCoO_2$ | 70:30 | 3 | 9 | 1/3 | 20 | 40 | 20 | 490,000 |
| Example 4 | $LiMn_{1.99}Al_{0.01}O_4$ | $LiCoO_2$ | 70:30 | 3 | 399 | 1/133 | 20 | 40 | 20 | 450,000 |
| Example 5 | $LiMn_{1.99}Al_{0.01}O_4$ | $LiCoO_2$ | 70:30 | 3 | 6 | 1/2 | 20 | 40 | 20 | 460,000 |
| Example 6 | $LiMn_{1.99}Al_{0.01}O_4$ | $LiCoO_2$ | 70:30 | 3 | 30 | 1/10 | 10 | 25 | 25 | 400,000 |
| Example 7 | $LiMn_{1.99}Al_{0.01}O_4$ | $LiCoO_2$ | 70:30 | 3 | 30 | 1/10 | 25 | 50 | 20 | 390,000 |
| Example 8 | $LiMn_{1.99}Al_{0.01}O_4$ | $LiCoO_2$ | 70:30 | 3 | 30 | 1/10 | 5 | 15 | 30 | 350,000 |
| Example 9 | $LiMn_{1.99}Al_{0.01}O_4$ | $LiCoO_2$ | 70:30 | 3 | 30 | 1/10 | 50 | 100 | 20 | 340,000 |
| Example 10 | $LiMn_{1.99}Al_{0.01}O_4$ | $LiCoO_2$ | 95:5 | 3 | 30 | 1/10 | 20 | 40 | 20 | 300,000 |
| Example 11 | $LiMn_{1.99}Al_{0.01}O_4$ | $LiCoO_2$ | 30:70 | 3 | 30 | 1/10 | 20 | 40 | 20 | 290,000 |
| Example 12 | $LiMn_{1.99}Al_{0.01}O_4$ | $LiCoO_2$ | 98:2 | 3 | 30 | 1/10 | 20 | 40 | 20 | 190,000 |
| Example 13 | $LiMn_{1.99}Al_{0.01}O_4$ | $LiCoO_2$ | 15:85 | 3 | 30 | 1/10 | 20 | 40 | 20 | 180,000 |
| Example 14 | $LiMn_{1.99}Al_{0.01}O_4$ | — | — | 3 | 30 | 1/10 | 20 | 40 | 20 | 100,000 |
| Example 15 | $LiMn_2O_4$ | — | — | 3 | 30 | 1/10 | 20 | 40 | 20 | 110,000 |
| Comparative Example 1 | $(LiFePO_4)$ | — | — | 3 | 30 | 1/10 | 20 | 40 | 20 | 110,000 |
| Comparative Example 2 | $LiMn_{1.99}Al_{0.01}O_4$ | $LiCoO_2$ | 70:30 | 3 | 30 | 1/10 | 80 | 150 | 18.75 | 30,000 |
| Comparative Example 3 | $LiMn_{1.99}Al_{0.01}O_4$ | $LiCoO_2$ | — | 3 | 30 | 1/10 | 2 | 5 | 25 | 30,000 |
| Comparative Example 4 | — | $LiCoO_2$ | — | 3 | 30 | 1/10 | 2 | 5 | 25 | 20,000 |
| Comparative Example 5 | — | $(LiNiO_2)$ | — | 3 | 30 | 1/10 | 2 | 5 | 25 | 20,000 |
| Comparative Example 6 | (Second Battery is not included) | | | | 30 | — | — | — | — | 10,000 |

TABLE 3-continued

|  | Average Charge-and-Discharge Efficiency per Cycle (Wh %) |
|---|---|
| Example 4 | |
| Comparative Example 5 | 70 |
| Comparative Example 6 | 50 |

The average charge-and-discharge efficiency per cycle shown in Table 3 was obtained according to the following formula.

Average Charge-and-Discharge Efficiency (%)=(Discharge Voltage×200 A×10 seconds)/(Charge Voltage×200 A×10 seconds)

Herein, the "discharge voltage" and the "charge voltage" are values obtained by time-integrating a measured value in each cycle and subjecting the integrated value to time average.

Each of the battery systems 1 of Examples 1 to 13 exhibits a larger number of cycles after which a battery capacity was reduced to 80% than that of each of the battery systems 1 of Comparative Examples 1 to 6. That is, the battery systems 1 of Examples 1 to 13 could exhibit more excellent life characteristics than those of the battery systems 1 of Comparative Examples 1 to 6. This is because the deterioration of the lead storage battery of the first battery 10 can be suppressed, owing to the fact that the resistance of the second battery 20 is lower than that of the first battery 10 in the battery systems 1 of Examples 1 to 13, which provides the second battery with a more portion of the current provided by rapid charge, and the fact that the second battery 20 can suppress a change in an open-circuit voltage even when an SOC is steeply changed in accordance with rapid charge and discharge.

Furthermore, the battery systems 1 of Examples 1 to 15 had an average charge-and-discharge efficiency per cycle higher than that of the battery systems of Comparative Examples 1 to 6. That is, the battery systems 1 of Examples 1 to 15 had more excellent rapid charge-and-discharge characteristics than those of the battery systems of Comparative Examples 1 to 6.

On the other hand, the battery system 1 of Comparative Example 1 had cycle characteristics poorer than those of the battery systems 1 of Examples 1 to 13. Furthermore, the battery system 1 of Comparative Example 1 had cycle characteristics particularly poorer than those of the battery systems 1 of Examples 1 to 11. In comparative example 1, the nonaqueous electrolyte battery of the second battery 20 did not contain the first positive electrode active material or the second positive electrode active material. Therefore, in Comparative Example 1, the open-circuit voltage of the second battery 20 is considered to be changed in accordance with a steep SOC change due to rapid charge and discharge.

The battery system 1 of Comparative Example 1 had an average charge-and-discharge efficiency per cycle lower than that of the battery systems of Examples 1 to 15. This is considered to be because the resistance of the whole battery system 1 is increased as a result of the deterioration of the first battery during a charge and discharge cycle in the battery system 1 of Comparative Example 1.

The battery system 1 of Comparative Example 2 had cycle characteristics poorer than those of the battery systems 1 of Examples 1 to 15. Furthermore, the battery system 1 of Comparative Example 2 had cycle characteristics remarkably poorer, particularly as compared with those of the battery systems 1 of Examples 1 to 13. As this result, in Comparative Example 2, the negative-electrode-mixture layer 24b in the nonaqueous electrolyte battery of the second battery 20 had a thickness of greater than 50 μm and a weight per unit area of greater than 100 g/m². Therefore, in Comparative Example 2, the movement distances of ions and electrons in the negative-electrode-mixture layer are increased, and the internal resistance of the nonaqueous electrolyte battery 20 is increased, which causes the increase in the change in the voltage between terminals of the second battery 20 when a current passes. As a result, the voltage between terminals of the first battery connected in parallel with the second battery 20 is considered to be also largely changed.

The battery system 1 of Comparative Example 2 had an average charge-and-discharge efficiency per cycle lower than those of the battery systems of Examples 1 to 15. This is considered to be because the resistance of the whole battery system 1 is increased as a result of the deterioration of the second battery during a charge-and-discharge cycle in the battery system 1 of Comparative Example 2.

The battery system 1 of Comparative Example 3 had cycle characteristics remarkably poorer than those of the battery systems 1 of Examples 1 to 15. In Comparative Example 3, in the nonaqueous electrolyte battery of the second battery 20, the negative-electrode-mixture layer 24b had a thickness of less than 5 μm and a weight per unit area of less than 15 g/m². Therefore, in Comparative Example 3, the second battery 20 is considered to be rapidly self-discharged and to be in an overdischarge state during rapid discharge. Due to this, it is considered that the rapid charge-and-discharge characteristics of the second battery 20 are impaired, and the first battery 10 assuming rapid charge-and-discharge instead of the second battery 20 is deteriorated.

The battery system 1 of Comparative Example 3 had an average charge-and-discharge efficiency per cycle lower than that of the battery systems of Examples 1 to 15. This is considered to be because the resistance of the whole battery system 1 is increased as a result of the deterioration of the second battery during a charge-and-discharge cycle in the battery system 1 of Comparative Example 3.

The battery system 1 of Comparative Example 4 had cycle characteristics remarkably poorer than those of the battery systems 1 of Examples 1 to 15. In Comparative Example 4, the second battery 20 did not contain the first positive electrode active material. Therefore, in comparative example 4, the open-circuit voltage of the second battery 20 is considered to be largely changed in accordance with a steep SOC change due to rapid charge and discharge.

Furthermore, the battery system 1 of Comparative Example 4 had an average charge-and-discharge efficiency per cycle lower than that of the battery systems of Examples 1 to 15. This is considered to be because the resistance of the whole battery system 1 is increased as a result of the deterioration of the second battery caused by a steep SOC change during a charge-and-discharge cycle in the battery system 1 of Comparative Example 4.

The battery system 1 of Comparative Example 5 had cycle characteristics remarkably poorer than those of the battery systems 1 of Examples 1 to 15. In Comparative Example 5, the second battery 20 did not contain the first positive electrode active material or the second positive electrode active material. Therefore, in Comparative Example 5, the open-circuit voltage of the second battery 20 is considered to be largely changed in accordance with a steep SOC change due to rapid charge and discharge.

Furthermore, the battery system 1 of Comparative Example 5 had an average charge-and-discharge efficiency per cycle lower than those of the battery systems of Examples 1 to 15. This is considered to be because the resistance of the whole battery system 1 is increased as a result of the deterioration of the second battery caused by a steep SOC change during a charge and discharge cycle in the battery system 1 of Comparative Example 5.

The battery system 1 of Comparative Example 6 had cycle characteristics remarkably poorer than those of the battery systems 1 of examples 1 to 11. The lead storage battery cannot adapt to a steep change in a voltage, i.e., rapid charge and discharge. Therefore, it is considered that the battery system 1 including only the first battery 10 is deteriorated by the rapid charge and discharge cycle.

Furthermore, the battery system 1 of Comparative Example 6 had an average charge-and-discharge efficiency per cycle lower than those of the battery systems of Examples 1 to 15. This is considered to be because the resistance of the whole battery system 1 is increased as a result of the deterioration of the second battery during a charge and discharge cycle in the battery system 1 of Comparative Example 6.

The battery systems 1 of Examples 1 to 5 had more excellent cycle characteristics than those of the battery systems 1 of Examples 6 to 11. In the battery systems 1 of Examples 1 to 5, the negative-electrode-mixture layer 24*b* had a thickness of 20 µm and a weight per unit area of 40 µm. Such a negative-electrode-mixture layer 24*b* had both excellent electron conductivity and ion conductivity. As a result, it is considered that the second battery 20 can have low internal resistance. Therefore, Examples 1 to 5 can further suppress the change in the voltage between terminals of the second battery 20 when a current passes. As a result, it is considered that Examples 1 to 5 can exhibit more excellent cycle characteristics than those of the battery systems 1 of examples 6 to 11.

The battery systems 1 of Examples 1 to 9 had more excellent cycle characteristics than those of the battery systems 1 of Examples 10 and 11. In the battery systems 1 of Examples 1 to 9, the mixing ratio of the first positive electrode active material and the second positive electrode active material was 80:20. It is considered that the second battery 20 having such mixing ratio can exhibit an excellent balance between an effect of showing a substantially constant open-circuit voltage over a wide SOC range due to the first positive electrode active material and an effect of make a voltage change right before the full charge of the second battery 20 and a voltage change right before the full discharge of the second battery 20 milder and successive due to the second positive electrode active material. Therefore, Examples 1 to 9 can further suppress the change in the open-circuit voltage of the second battery 20 accompanied by the change in the SOC. As a result, it is considered that the battery systems 1 of Examples 1 to 9 can exhibit more excellent cycle characteristics than those of the battery systems 1 of Examples 10 and 11.

The battery systems 1 of Examples 1 to 3 had a more excellent cycle life than that of the battery system 1 of Example 4. The ratio of the battery capacity of the second battery 20 to the battery capacity of the first battery 10 in the battery systems 1 of Examples 1 to 3 was greater than that of the battery system of Example 4. Therefore, it is considered that, in the battery systems 1 of Examples 1 to 3, the change in the voltage between terminals of the first battery 10 can be suppressed by the second battery 20 as compared with Example 4.

The battery systems 1 of Examples 1 to 3 had a more excellent cycle life than that of the battery system 1 of Example 5. The ratio of the battery capacity of the first battery 10 to the battery capacity of the second battery 20 in the battery systems 1 of Examples 1 to 3 was greater than that in the battery system of Example 5. Therefore, it is considered that, in the battery systems 1 of Examples 1 to 3, the change in the voltage between terminals of the second battery 20 can be suppressed by the first battery 10 as compared with Example 5.

The battery systems 1 of Examples 1 to 11 had more excellent cycle characteristics than those of the battery system 1 of Example 12. This is considered to be because, in the battery systems 1 of Examples 1 to 11, the mixing ratio of the first positive electrode active material to the second positive electrode active material is in a range of 95:5 to 30:70 in a weight ratio, and because of this, the frequency of a change in the voltage of the first battery to a voltage close to that at an overcharge state or that at an overdischarge state can be suppressed as compared with Example 12, which can provide further suppression of the deterioration of the first battery.

In other words, the battery system 1 of Example 12 had cycle characteristics poorer than those of the battery systems 1 of Examples 1 to 11. In example 12, the amount of the first positive electrode active material was 98% by weight, and greater than 95% by weight. Therefore, it is considered that the frequency of a change in the voltage of the first battery to a voltage close to that at an overcharge state or that at an overdischarge state is increased as compared with Examples 1 to 11, and the life characteristics of the first battery are deteriorated as compared with Examples 1 to 11.

The battery systems 1 of Examples 1 to 11 had more excellent cycle characteristics than those of the battery system 1 of Example 13. This is considered to be because, in the battery systems 1 of Examples 1 to 11, the mixing ratio of the first positive electrode active material to the second positive electrode active material is in a range of 95:5 to 30:70 in a weight ratio, and because of this, an SOC range where the first positive electrode active material shows a substantially constant open-circuit voltage can be made wider than that of Example 13. As a result, this is considered to be because the change in the open-circuit voltage of the second battery 20 accompanied by the change in the SOC by the rapid charge and discharge can be further suppressed.

In other words, the battery system 1 of Example 13 had cycle characteristics poorer than those of the battery systems 1 of Examples 1 to 11. In Example 13, the amount of the first positive electrode active material to the amount of the second positive electrode active material in the nonaqueous electrolyte battery of the second battery 20 was small as compared with Examples 1 to 11. Therefore, it is considered that, in Example 13, an SOC range where the first positive electrode active material shows a substantially constant open-circuit voltage is narrower than that of Examples 1 to 11, and as a result, the open-circuit voltage of the second battery 20 is largely changed as compared with Examples 1 to 11, accompanied by the change in the SOC by the rapid charge and discharge.

The battery systems 1 of Examples 1 to 13 had more excellent cycle characteristics than those of the battery systems of Examples 14 and 15. In the battery systems 1 of Examples 1 to 13, the second battery contained the second positive electrode active material. Because of this, it is considered that the battery systems 1 of Examples 1 to 13 can further prevent a rapid voltage change when the second battery becomes a state close to the full charge state and the full discharge state, and the voltage range of the first lead storage battery during the cycles can be made less than that in Examples 14 and 15.

In other words, the battery systems 1 of Examples 14 and 15 had cycle characteristics poorer than those of the battery systems 1 of Examples 1 to 11. In Examples 14 and 15, the second battery 20 did not contain the second positive electrode active material. Therefore, Examples 14 and 15 caused a sudden voltage change as compared with Examples 1 to 11 when the second battery becomes a state close to the full charge state and the full discharge state. Therefore, the voltage range of the first lead storage battery during the cycles was larger than that of Examples 1 to 11, and the cycle characteristics of Examples 14 and 15 were deteriorated as compared with those of Examples 1 to 11.

The battery system according to at least one embodiment and example described above includes a first battery including a lead storage battery; and a second battery connected in parallel with the first battery and including a nonaqueous electrolyte battery. A negative electrode of the nonaqueous electrolyte battery includes a negative-electrode-mixture layer, and the negative-electrode-mixture layer contains lithium titanate. The negative-electrode-mixture layer has a weight per unit area of 15 g/m² to 100 g/m² and a thickness of 5 μm to 50 μm. The nonaqueous electrolyte battery includes a positive electrode containing $LiMn_{2-x}M(a)_xO_4$. Therefore, the battery system according to the embodiment can be rapidly charged and exhibit an excellent cycle life.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery system comprising:
   a first battery comprising a lead storage battery; and
   a second battery connected in parallel with the first battery and comprising a nonaqueous electrolyte battery comprising a positive electrode and a negative electrode including a negative-electrode-current collector and a negative-electrode-mixture layer formed on the negative electrode current collector,
   wherein the negative-electrode-mixture layer comprises lithium titanate, and has a weight per unit area in a range of 15 g/m² to 100 g/m², a thickness in a range of 5 μm to 50 μm, and a density in a range of $3 \times 10^5$ g/m³ to $25 \times 10^5$ g/m³;
   the positive electrode comprises a first positive electrode active material and a second positive electrode active material in a weight ratio in a range of 95:5 to 70:30;
   the first positive electrode active material has a spinel structure, and is a compound represented by $LiMn_{2-x}(a)_xO_4$ wherein M(a) comprises at least one element selected from the group consisting of Co, Ni, Al, Cr, Fe, Nb, Mg, B and F, and x is in a range of 0≤x≤0.7;
   the second positive electrode active material is a compound represented by $LiCo_{1-y}M(b)_yO_2$ wherein M(b) comprises at least one element selected from the group consisting of Ni, Al, Mn, Cr, Fe, Nb, Mg, B and F, and y is in a range of 0≤y≤0.3; and
   a ratio of a battery capacity of the second battery to a battery capacity of the first battery is in a range of 1/133 to 1/2.

2. The battery system according to claim 1, wherein the density is in a range of $3 \times 10^5$ g/m³ to $20 \times 10^5$ g/m³.

3. The battery system according to claim 1, wherein the first positive electrode active material is selected at least one from the group consisting of $LiMn_{1.99}Al_{0.01}O_4$ and $LiMn_2O_4$.

4. The battery system according to claim 1, wherein the second positive electrode active material is $LiCoO_2$.

5. The battery system according to claim 1, wherein the weight per unit area is in a range of 15 g/m² to 40 g/m².

6. The battery system according to claim 1, wherein the thickness is in a range of 5 μm to 25 μm.

7. The battery system according to claim 1, wherein the ratio of the battery capacity of the second battery to the battery capacity of the first battery is in a range of 1/100 to 1/10.

* * * * *